United States Patent [19]

Washizu et al.

[11] Patent Number: 4,778,781

[45] Date of Patent: Oct. 18, 1988

[54] PRESSURE-SENSITIVE RECORDING PAPER CONTAINING MICROCAPSULES

[75] Inventors: Shintarou Washizu; Keiso Saeki; Sumitaka Tatsuta, all of Shizuoka, Japan

[73] Assignee: Fuji Photo Film Co., Ltd., Kanagawa, Japan

[21] Appl. No.: 936,308

[22] Filed: Dec. 1, 1986

[30] Foreign Application Priority Data

Nov. 29, 1985 [JP]  Japan ................... 60-268901

[51] Int. Cl.$^4$ .................. B01J 13/02; B41M 5/22
[52] U.S. Cl. ..................... 503/215; 264/4.3; 264/4.7; 424/455; 424/497; 428/402.21; 428/914
[58] Field of Search ................ 264/4.3, 4.7; 346/215; 503/215

[56] References Cited

U.S. PATENT DOCUMENTS

| | | | |
|---|---|---|---|
| 3,432,327 | 3/1969 | Kan et al. | 264/4.7 X |
| 3,778,383 | 12/1973 | Schibler et al. | 264/4.7 X |
| 4,308,165 | 12/1981 | Vassiliades et al. | 346/215 X |
| 4,353,809 | 10/1982 | Hoshi et al. | 264/4.7 |

FOREIGN PATENT DOCUMENTS

| | | |
|---|---|---|
| 1375142 | 11/1974 | United Kingdom . |
| 1452504 | 10/1976 | United Kingdom . |
| 1467478 | 3/1977 | United Kingdom . |
| 2048206 | 12/1980 | United Kingdom . |

*Primary Examiner*—Richard D. Lovering
*Attorney, Agent, or Firm*—Sughrue, Mion, Zinn, Macpeak & Seas

[57] ABSTRACT

Microcapsules, a process for preparing the same, and a pressure-sensitive recording paper containing the same are disclosed. The microcapsules are prepared by a process which comprises polymerizing melamine and formaldehyde, or polymerizing initial condensates of melamine and formaldehyde, around hydrophobic oil droplets containing a polyisocyanate or a prepolymer of polyisocyanate, wherein a polyhydroxy compound is incorporated into said hydrophobic oil droplets prior to microencapsulation, thereby producing a sturdy double wall made of of polyurethaneurea film (inner wall) and melamine/formaldehyde resin film (outer wall).

10 Claims, No Drawings

PRESSURE-SENSITIVE RECORDING PAPER CONTAINING MICROCAPSULES

FIELD OF THE INVENTION

The present invention relates to microcapsules having a sturdy film wall, a process for preparing the same, and a pressure-sensitive recording paper containing the same.

BACKGROUND OF THE INVENTION

Process for preparing microcapsules include a coacervation process, an interfacial polymerization process, an internal polymerization process, and an external polymerization process.

The coacervation process, though having been widely employed suffers from the following defects, because gelatin is used therein as an essential component:

(a) microcapsules formed are poor in water resisting property,
(b) the cost for producing microcapsules is high,
(c) it is difficult to produce a concentrated solution of microcapsules,
(d) the process for microencapsulating is complicated, and so on.

The interfacial polymerization process consists in using a hydrophobic monomer and a hydrophilic monomer, and causing a polymerization reaction therebetween at the core materials and water interfaces to form film walls. This process also has several disadvantages in that it is restricted in the possible combinations of reacting monomers to be selected from a handling point of view, it is difficult to ensure dense microencapsulation, it is difficult to control the polymerization reaction, it is difficult to thicken the film walls of the microcapsules, and so on.

In the internal polymerization process, wall films are formed by polymerization of reactants from the inside of a core material, as described in German Pat. No. 2,342,066, while in the external polymerization process the wall films are formed by polymerization of reactants from the outside of a core material, as described in U.S. Pat. Nos. 4,233,178, 4,251,386, 4,356,109, 4,219,604, 4,221,710, and Japanese Patent Application (OPI) No. 51238/81 (the term "OPI" as used herein means an "unexamined published application").

With the recent expansion of fields to which microcapsules are applicable, the following requirements have come to be applied to processes for producing microcapsules:

(1) they can be applied to various kinds of core materials,
(2) they enable encapsulation in a high concentration and with high yield,
(3) microencapsulation can be carried out at a low cost,
(4) steps for microencapsulation can be controlled with ease,
(5) film walls formed are highly resistive to various solvents,
(6) microcapsules formed have excellent resistance to heat,
(7) microcapsules having desired size and physical strength can be obtained,
(8) the microcapsule slurry obtained has a low viscosity,
(9) the time for the microencapsulating step is short, and so on.

The process proposed by the foregoing German Pat. No. 2,342,066 is insufficient in solvent proofing property (the above-described requirement (5)), while the processes proposed by U.S. Pat. Nos. 4,233,178, 4,251,386, 4,356,109, 4,219,604 and 4,221,710, and Japanese Patent Application (OPI) No. 51238/81 are insufficient in physical strength (requirement (7)).

Also, a combination of an internal polymerization process with an interfacial polymerization process, as disclosed in British Pat. No. 1,416,224, and the combination of an interfacial polymerization process with an external polymerization process, as disclosed in U.S. Pat. Nos. 4,353,809, 3,981,821, cannot provide such microcapsules as to fulfil both the requirement (5) and (7). When microcapsules insufficient in solvent proofing property are applied to pressure-sensitive recording sheets, a solvent contained in printing ink causes colored fog, or an ingredient incorporated in microcapsules is extracted with a solvent contained in desensitizing ink, a felt-tip pen, or the like, to cause the lowering of color formability.

On the other hand, when microcapsules poor in physical strength corresponding to the requirement (7) are applied to pressure sensitive recording paper, pressure marks tend to occur.

SUMMARY OF THE INVENTION

An object of the present invention is to provide microcapsules which overcomes the above-described problems, a process for preparing the same, and a pressure-sensitive recording paper containing the same.

In particular, the object comprises providing microcapsules excellent in solvent proofing property, heat resistance, and physical strength, a process for preparing the same, and a pressure-sensitive recording paper containing the same.

The above-described object is attained by microcapsules prepared by a process which comprises polymerizing melamine and formaldehyde, or polymerizing initial condensates of melamine and formaldehyde, around hydrophobic oil droplets containing a polyisocyanate or a polyisocyanate prepolymer, wherein a polyhydroxy compound is incorporated in the hydrophobic oil droplets prior to microencapsulation. This result in formation of a film wall formed of polyurethaneurea resin on the inside facing the oil droplets, in addition to the formation of a film wall formed of melamine/formaldehyde resin on the outside.

DETAILED DESCRIPTION OF THE INVENTION

The terminology polyisocyanates or prepolymers thereof used in the present invention refers to compounds containing two or more isocyanate groups, and specific examples thereof include diisocyanates such as m-phenylenediisocyanate, p-phenylenediisocyanate, 2,6-tolylenediisocyanate, 2,4-tolylenediisocyanate, naphthalene-1,4-diisocyanate, 4,4'-diphenylmethanediisocyanate, 3,3'-dimethoxy-4,4'-biphenyldiisocyanate, 3,3'-dimethyldiphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate, propylene-1,2-diisocyanate, butylene-1,2-diisocyanate, ethylidinediisocyanate, cyclohexylene-1,2-diisocyanate, cyclohexylene-1,4-diisocyanate, etc.; triisocyanates such as 4,4′,4″-triphenylmethanetriisocyanate, toluene-2,4,6-triisocyanate, polymethylenepolyphenyltriisocyanate, etc.; tetraisocyanates such as 4,4′-dimethyldiphenylmethane-2,2′,5,5′-tetraisocyanate, etc.; polyisocyanate prepolymers such as polymethylenepolyphenylpolyisocyanate, addition products of hexamethylenediisocyanate and hexanetriol, addition products of 2,4-tolylenediisocyanate and Brenzcatechin, addition products of tolylenediisocyanate and hexanetriol, addition products of tolylenediisocyanate and trimethylolpropane, addition products of xylylenediisocyanate and trimethylolpropane, addition products of hexamethylenediisocyanate and trimethylolpropane, etc.; and any suitable polyisocyanates which are analogous to the above-described ones. Of these compounds, the prepolymers are particularly preferred. It is also possible to employ a combination of two or more of the foregoing polyisocyanate.

Suitable examples of polyhydroxy compounds include aliphatic and aromatic polyhydric alcohols, hydroxypolyesters, hydroxypolyalkylene ethers, alkylene oxide adducts of polyamines, and the like. Specific examples of aliphatic and aromatic polyhydric alcohols which can be used in the present invention include catechol, resorcinol, hydroquinone, 1,2-dihydroxy-4-methylbenzene, 1,3-dihydroxy-5-methylbenzene, 3,4-dihydroxy-1-methylbenzene, 3,5-dihydroxy-1-methylbenzene, 2,4-dihydroxyethylbenzene, 1,3-naphthalenediol, 1,5-naphthalenediol, 2,7-naphthalenediol, 2,3-naphthalenediol, o,o′-biphenol, p,p′-biphenol, 1,1′-bi-2-naphthol, bis-phenol A, 2,2′-bis-(4-hydroxyphenyl)butane, 2,2′-bis-(4-hydroxyphenyl)isopentane, 1,1′-bis(4-hydroxyphenyl)cyclopentane, 1,1′-bis-(4-hydroxyphenyl)cyclohexane, 2,2′-bis-(4-hydroxy-3-methylphenyl)propane, bis-(2-hydroxyphenyl)methane, xylylenediol, ethylene glycol, 1,3-propylene glycol, 1,4-butylene glycol, 1,5-pentanediol, 1,6-heptanediol, 1,7-heptanediol, 1,8-octanediol, 1,1,1-trimethylolpropane, hexanetriol, pentaerythritol, glycerine, and sorbitol.

Hydroxypolyesters which can be used include, for example, those prepared from polycarboxylic acids and polyhydric alcohols. Suitable examples of polycarboxylic acids to be employed for producing hydroxypolyesters include malonic acid, succinic acid, glutaric acid, adipic acid, pimelic acid, maleic acid, isophthalic acid, terephthalic acid, gluconic acid and so on, while suitable examples of polyhydric alcohols include the same ones as set forth above.

Hydroxypolyalkylene ethers which can be used include, for example, condensation products of alkylene oxides and polyhydric alcohols, and the like. Alkylene oxides used for producing hydroxypolyalkylene ethers include butylene oxide, amylene oxide and the like, and polyhydric alcohols which can be used include the same ones as set forth above.

"An addition product of a polyamine and an alkylene oxide" refers to a compound wherein one or more of the hydrogens of an amino moiety of a polyamine is substituted with an alkylene oxide. Suitable examples of polyamines which can be used for producing the addition products of polyamines and alkylene oxides include aromatic polyamines such as o-phenylenediamine, p-phenylenediamine, diaminonaphthalene, and the like; and a aliphatic polyamines such as ethylenediamine, 1,3-propylenediamine, diethylenetriamine, triethylenetetramine, 1,6-hexamethylenediamine, and the like. Examples of alkylene oxides which can be added to these polyamines include ethylene oxide, propylene oxide, butylene oxide, and so on.

Of the foregoing polyhydroxy compounds, alkylene oxide adducts of polyamines are particularly preferred. A desirable molecular weight of such adducts ranges from about 800 to about 5,000, and more preferably from 900 to 3,000.

These polyhydroxy compounds may be employed as a mixture of two or more thereof.

These film wall forming substances may be added directly to the hydrophobic oily liquid, or they may be previously dissolved in an organic solvent and then added to hydrophobic oily liquid. They do not have any restriction as to addition manner, except that they must be added to hydrophobic oily liquid prior to the emulsification step.

The polyisocyanate or prepolymer thereof is typically used in an amount ranging from 0.005 to 3 parts, and preferably from 0.01 to 2 parts, per 100 parts by weight of hydrophobic oily liquid.

A more preferred amount thereof ranges from 0.2 to 2 parts, and most preferred is the ranges of from 1 to 1.5 parts.

On the other hand, a suitable amount of a polyhydroxy compound to be used typically ranges from about 10 to about 100 parts, and particularly preferably is from 20 to 40 parts, per 100 parts by weight of polyisocyanate or a prepolymer to be used in combination.

The encapsulation process employed in the present invention is described in more detail below.

The process of the present invention preferably comprises the following steps of:

(1) preparing an aqueous solution containing a water-soluble high polymer;
(2) emulsifying and dispersing a hydrophobic oily liquid, to which a polyisocyanate or a prepolymer therof and a polyhydroxy compound are added in advance, in the aqueous solution prepared in step (1);
(3) adding aqueous solution of melamine and formaldehyde or an initial condensation product (condensate) thereof to the emulsion prepared in step (2);
(4) adjusting the pH of the system to 5.0 to 7.0, preferably 5.5 to 6.4, and raising the temperature of the system to 50° to 80° C., preferably 60° to 70° C. with stirring, thereby forming an inner wall of polyurethaneurea resin from the inside of the oily liquid dispersed and at the same time, forming an outer wall of melamine/formaldehyde resin through polycondensation reaction of melamine and formaldehyde.

If desired, an additional step, (5), can be conducted, viz., removing residual formaldehyde from the system after pH adjustment to 2.0 to 4.0 by adding a formaldehyde scavenger.

Further, the use of an ammonium salt of acid at the time of condensation reaction of melamine and formaldehyde can promote the reaction. Especially favorable ammonium salts for such a purpose are, e.g., ammonium chloride, ammonium sulfate, ammonium nitrate, and ammonium dihydrogenphosphate.

Example of materials for the nucleus of the individual microcapsules in the present invention include natural mineral oils, animal oils, vegetable oils, synthetic oils, and so on. Specific examples of mineral oils which can used include petroleum and petroleum fractions such as kerosene, gasoline, naphtha, and paraffin oil. Specific examples of animal oils which can be used include fish oils, lard oil and the like. Specific examples of vegetable oils which can be used include peanut oil, linseed oil, soybean oil, castor oil, corn oil and the like. Specific examples of synthetic oils which can be used include biphenyl compounds (such as isopropyl-substituted biphenyls, isoamyl-substituted biphenyls, etc.), terphenyl compounds (e.g., those described in German Patent Application (OLS) No. 2,153,635), phosphate compounds (such as triphenyl phosphate), naphthalene compounds (e.g., those described in German Patent Application (OLS) No. 2,141,194), methane compounds (e.g., those described in German Patent Application (OLS) No. 2,153,634), phthaloylated compounds (e.g., diethyl phthalate, dibutyl phthalate, dioctyl phthalate, etc.), salicyclic acid derivatives (such as ethyl salicylate), and so on.

Into these natural mineral oils, animal oils, vegetable oils and synthetic oils, components such as agricultural chemicals, medicines, perfumes, chemicals, adhesives, liquid crystals, foods, detergents, dyestuffs, dye precursors, developers, catalysts, rust inhibitors, and so on can be appropriately admixed depending upon the end use purposes.

A suitable amount of a water-soluble high polymer to be used in the present invention corresponds to from 0.5 to 30%, and preferably from 1 to 20%, with respect to the hydrophobic oily liquid to be included therein. The expression "water-soluble high polymer" is intended to include water soluble anionic high polymers, nonionic high polymers and amphoteric high polymers. Anionic high polymers which can be used include both natural and synthetic ones, for example, those containing —COO⁻ group, —SO₃⁻ group, or the like. More specifically, anionic natural high polymers include gum arabic, alginic acid, and so on, and semisynthetic polymers include carboxymethyl cellulose, phthaloylated gelatin, sulfonated starch, cellulose sulfate, lignin sulfonate, and so on.

In addition, synthetic anionic high polymers which can be used include maleic anhydride copolymers (including hydrolysis products thereof), acrylic acid (including methacrylic acid) homo- and co-polymers, vinylbenzenesulfonic acid homo- and co-polymers, carboxydenatured polyvinyl alcohol, and so on.

Amphoteric high polymers which can be used include gelatin and the like.

Specific examples of maleic anhydride copolymers (including hydrolysis products thereof) include methyl vinyl ether/maleic anhydride copolymer, ethylene/maleic anhydride copolymer, vinyl acetate/maleic anhydride copolymer, methacrylamide/maleic anhydride copolymer, isobutylene/maleic anhydride copolymer, styrene/maleic anhydride copolymer and so on. A preferred molecular weight of such copolymers is within the range of from 5,000 to 2,000,000.

Specific examples of acrylic acid copolymers which can be used include methylacrylate/acrylic acid copolymer, ethylacrylate/acrylic acid copolymer, methylacrylate/methacrylic acid copolymer, methylmethacrylate/acrylic acid copolymer, methylmethacrylate/methacrylic acid copolymer, methylacrylate/acrylamide/acrylic acid copolymer, acrylonitrile/acrylic acid copolymer, acrylonitrile/methacrylic acid copolymer, hydroxyethylacrylate/acrylic acid copolymer, hydroxyethylmeth-acrylate/methacrylic acid copolymer, vinylacetate/acrylic acid copolymer, vinylacetate/methacrylic acid copolymer, acrylamide/acrylic acid copolymer, acrylamide/methacrylic acid copolymer, methacrylamide/acrylic acid copolymer, methacrylamide/methacrylic acid copolymer, and alkali metal salts thereof.

A preferred molecular weight of such acrylic acid copolymers is within the range of from 20,000 to 1,000,000, and a preferred fraction of acrylic acid or methacrylic acid (or a salt thereof) in the copolymers as set forth above is from 5 to 100 mol%.

Specific examples of vinylbenzenesulfonic acid copolymers include methylacrylate/vinylbenzenesulfonic acid (or a salt thereof) copolymer, vinylacetate/vinylbenzenesulfonic acid copolymer, acrylamide/vinylbenzenesulfonic acid copolymer, acryloylmorpholine/vinylbenzenesulfonic acid copolymer, vinylpyrrolidone/vinylbenzenesulfonic acid copolymer, and so on.

A preferred molecular weight of vinylbenzenesulfonic acid copolymers as set forth above ranges from 5,000 to 2,000,000, more preferably from 10,000 to 1,000,000, and particularly preferably from 20,000 to 500,000.

Suitable carboxy-denatured polyvinyl alcohols are those having a molecular weight of from 1,000 to 300,000, a saponification degree of 90% or more, and a carboxy group content of from about 1 to 40 mol%. A carboxy-denatured polyvinyl alcohol can be prepared, for example, using a method which involves copolymerizing a carboxy group-containing vinyl or vinylidene monomer (for details of such monomers Canadian Pat. No. 929,430 or so on can be referred to) and a vinyl ester (e.g., $C_1$–$C_5$ acid ester of vinyl alcohol), and hydrolyzing the resulting copolymer, and so on. Carboxy-denatured polyvinyl alcohols prepared by the above-described methods and so on can be used in the present invention.

Nonionic high polymers which can be used include both natural and synthetic ones. For example, —OH group containing high polymers can be cited.

Specific examples of semisynthetic nonionic high polymers include hydroxyethyl cellulose, pullulan (noncrystalline, highly water-soluble macromolecular polysaccharide prepared from starch using a microbial fermentation method), soluble starch, oxidized starch and so on.

On the other hand, polyvinyl alcohol is one of the representatives of synthetic nonionic high polymers.

A preferred polyvinyl alcohol has a molecular weight of from about 10,000 to about 200,000 and a sapponification degree of 90% or more.

In order to effect the polycondensation reaction of melamine and formaldehyde to form the outer wall film of microcapsules in the present invention, it is necessary to control the pH of the system as a whole to 7.0 or less. Desirably the system is adjusted to a pH of 6.5 or less.

As a starting material for forming melamine-formaldehyde resin to function as the outer wall film of the microcapsules, an aqueous solution of a melamine-formaldehyde mixture, or methylolmelamine is employed. Methylolmelamine can be prepared with ease by heating a mixture of melamine and formalin (37 wt% formaldehyde) at 40° C. or above (preferably within the range of from 50° to 70° C.) under a weakly alkaline condition. In addition, commercially available methylolmelamine may be used as the starting material.

The molar ratio of melamine to formaldehyde, having a great influence on denseness, strength, and shape of the microcapsule wall formed, generally ranges from about 3/2 to 4/1, and preferably is from 2/1 to 3/1.

In the aqueous solution of a melamine-formaldehyde mixture, melamine present in a dissolved condition is preferable to melamine dispersed in a solid condition.

Microencapsulation is based on the simultaneous formation of the inner wall of polyurethane and the outer wall of melamine/formaldehyde resin. A suitable reaction time depends on the reaction temperature. For instance, one hour suffices for the conclusion of microencapsulation at a temperature of 60° C. or higher. A suitable reaction temperature is 40° C. or higher, with a preferably range being from 50° to 95° C.

It is important from the hygienic point of view to dispose of residual free formaldehyde. For this purpose, a formaldehyde scavenger is added to the microcapsule slurry finished.

Examples of formaldehyde scavengers which can be used include urea, sulfites, hydrogensulfites, ethyleneurea, hydroxylamine hydrochloride, and so on. In order to make these scavengers function under the optimal reaction condition, it is necessary to control the pH of the microcapsule slurry. For example, it is effective to adjust the pH of the system to the acidic region when urea or methyleneurea is employed as scavenger. In particular, pH of 4 or less is desirable. The microcapsule slurry of the present invention does not cause an increase in viscosity, nor does it suffer from condensation, even in a low pH region. Therefore, removal of residual formaldehyde can be carried out efficiently.

A size of microcapsules can be properly selected depending on the end use purpose. When microcapsules are applied to a pressure-sensitive recording paper, a generally suitable number average size thereof is from 1 to 20 μm; preferably the average size is from 1.5 to 8 μm, and particularly preferably it is from 2 to 5 μm.

The present invention is particularly effective in producing microcapsules to be employed for pressure-sensitive recording paper.

According to the present invention, microcapsules having a sturdy double wall, i.e., an inner wall of polyurethaneurea resin and an outer wall of melamine/-formaldehyde resin, can be obtained. Therefore, a pressure-sensitive recording paper free from stain and local coloration, or having no area that cannot be colored resulting from uneven coating or so on, that is to say, having uniform quality, can be produced. Moreover, the present invention can provide highly pressure-resistant, rubbing-resistant, heat-resistant and organic solvent-proofing characteristics to microcapsule walls. Accordingly, pressure-sensitive recording paper having strong resistance to fog caused by ink solvent and stress upon printing process, a property of preventing the lowering of color formability to be caused by invasion of an organic solvent contained, e.g., in desensitizing ink, a felt-tip pen or the like into the interior of microcapsules, and high resistance to pressure marks to be caused by cutting work can be obtained using the method of the present invention.

The pressure-sensitive recording paper according to the present invention can be prepared in a conventional manner as described in, for example, U.S. Pat. Nos. 3,836,383, 3,463,655, 4,219,219, 4,289,332, 4,353,809, 4,418,942, 4,560,199 and 4,559,242. A microcapsule coating composition is coated on a base paper for a pressure-sensitive recording paper so as to provide dry coverage as a solid state of from 1 to 10 g/m², more preferably, 2 to 7 g/m².

The present invention is illustrated in greater detail with respect to properties acquired by pressure-sensitive recording sheets when the present invention is applied thereto. However, the present invention should not be construed as being limited to the following examples.

EXAMPLE 1

Partial sodium salt of polyvinylbenzenesulfonic acid (VERSA TL 500, mean molecular weight 500,000, produced by National Starch Co.) was used as a water-soluble high polymer. 5 g of VERSA TL 500 was added with stirring to 95 g of water heated to about 80° C. to dissolve therein, and then cooled. The pH of the water solution was 2 to 3, and it was changed to 6.0 by adding a 20 wt% of sodium hydroxide aqueous solution.

Separately, 4 g of Crystal Violet lactone (CVL) as color former was dissolved in 100 g of KMC-113 (trade name; an alkylnaphthalene containing diisopropylnaphthalene as a main component, produced by Kureha Chemical Industry Co., Ltd.) under heating to obtain a hydrophobic solution to be the nucleus for the individual microcapsules. Into the hydrophobic solution after cooling to 20° C., 1.2 g of a mixture of 4,4'-diphenylmethanediisocyanate (MDI) polymers (Millionate MR 100, produced by Nippon Polyurethane Industry Co., Ltd.) as a polyisocyanate and 0.3 g of a butylene oxide adduct of ethylenediamine (mole number of butylene oxide added to 1 mole of ethylenediamine: 16.8, molecular weight: 1267) as a polyhydroxy compound were dissolved. This solution was added to the foregoing aqueous solution of water-soluble high polymer with vigorous stirring to produce an oil/water (O/W) emulsion. Stirring was stopped when the oil droplet size number average became 4.0 μm.

Further, a transparent aqueous mixture of melamine, formaldehyde, and a melamine/formaldehyde initial condensate was prepared by mixing 6 g of melamine, 11 g of a 37 wt% solution of formaldehyde and 83 g of water, and heating the mixture to 60° C. with stirring over a period of 30 minutes. The pH of this aqueous mixture was from 6 to 8. It was admixed with the foregoing emulsion, and adjusted to pH 6.0 by adding thereto a 10 wt% water solution of phosphoric acid with stirring. The mixture was heated up to 65° C., and the stirring was further continued for about 1 hour to complete encapsulation.

This capsule solution was cooled to room temperature, and adjusted to pH 9.0 using a 20 wt% of sodium hydroxide solution.

EXAMPLE 2

A microcapsule solution was prepared in the same manner as in Example 1, except that a mixture of 4.2 g of 3,6-bis-diphenylaminofluoran, 0.2 g of 3-diphenylamino-6-(N-phenyl-N-isopropylphenyl)aminofluoran, 0.2 g of 3,6-bis-diethylaminofluoran-p-nitroanilinolactam and 1 g of 2,2,4-trimethyl-1,2-dihydroxyquinoline was used in place of CVL dissolved in the hydrophobic oily liquid, and 0.3 g of butylene oxide adduct of ethylenediamine (mole number of butylene oxide added to 1 mole of ethylenediamine: 12, molecular weight: 924) was employed as a polyhydroxy compound to be added to the hydrophobic solution.

EXAMPLE 3

A microcapsule solution was prepared in the same manner as in Example 2, except that an amount of the polyhydroxy compound to be added to the hydrophobic solution was changed to 1.2 g.

EXAMPLE 4

A microcapsule solution was prepared in the same manner as in Example 2, except that 1.2 g of a trimethylolpropane adduct of tolylenediisocyanate (Vernoc D-750, produced by Dai-Nippon Ink & Chemicals, Inc.) was employed as polyisocyanate to be added to the hydrohobic solution.

EXAMPLE 5

A microcapsule solution was prepared in the same manner as in Example 1, except that 0.6 g of Millionate MR 100 and 0.6 g of Vernoc D-750 were used as polyisocyanate to be added to the hydrophobic solution, and 0.3 g of an ethylene oxide and propylene oxide adduct of ethylenediamine (mole numbers of ethylene oxide and propylene oxide added to ethylenediamine: 2.5 and 73 respectively, molecular weight: 4400) was used as a polyhydroxy compound.

COMPARATIVE EXAMPLE 1

A microcapsule solution was prepared in the same manner as in Example 1, except that the addition of polyisocyanate and polyhydroxy compound to the hydrophobic solution was not carried out.

COMPARATIVE EXAMPLE 2

A microcapsule solution was prepared in the same manner as in Example 1, except that the addition of polyisocyanate to the hydrophobic solution was not carried out.

COMPARATIVE EXAMPLE 3

A microcapsule solution was prepared in the same manner as in Example 1, except that the addition of polyhydroxy compound to the hydrophobic solution was not carried out.

COMPARATIVE EXAMPLE 4

A microcapsule solution was prepared in the same manner as in Example 2, except that the addition of polyisocyanate and polyhydroxy compound to the hydrophobic solution was not carried out.

COMPARATIVE EXAMPLE 5

A microcapsule solution was prepared in the same manner as in Example 1, of British Pat. No. 1,416,224, except that CVL was used as a color former in the hydrophobic oily liquid.

The compositions of the thus prepared microcapsule solutions are summarized in Table 1.

TABLE 1

Composition of Microcapsule Solution

| Sample No. | Color Former | Polyisocyanate | Polyhydroxy Compound |
|---|---|---|---|
| Example 1 | Crystal Violet Lactone 4.0 g | 4,4'-Diphenylmethanediisocyanate polymer mixture 1.2 g | Ethylenediamine/butylene oxide (1/16.8 by mole) adduct (molecular weight: 1267) 0.3 g |
| Example 2 | 3,6-Bis-diphenylamino-fluoran 4.2 g<br>3-Diphenylamino-6-(N-phenyl-N—phenyl-N—isopropylphenyl)aminofluoran 0.2 g<br>3,6-Bis-diethylaminofluoran-p-nitro-anilinolactam 0.2 g | 4,4'-Diphenylmethanediisocyanate polymer mixture 1.2 g | Ethylenediamine/butylene oxide (1/12 by mole) adduct (molecular weight: 924) 0.3 g |
| Example 3 | 3,6-Bis-diphenylamino-fluoran 4.2 g<br>3-Diphenylamino-6-(N-phenyl-N—phenyl-N—isopropylphenyl)aminofluoran 0.2 g<br>3,6-Bis-diethylaminofluoran-p-nitro-anilinolactum 0.2 g | 4,4'-Diphenylmethanediisocyanate polymer mixture 1.2 g | Ethylenediamine/butylene oxide (1/12 by mole) adduct (molecular weight: 924) 1.2 g |
| Example 4 | 3,6-Bis-diphenylamino-fluoran 4.2 g<br>3-Diphenylamino-6-(N-phenyl-N—phenyl-N—isopropylphenyl)aminofluoran 0.2 g<br>3,6-Bis-diethylaminofluoran-p-nitro-anilinolactum 0.2 g | Tolylenediisocyanate/trimethylolpropane adduct 1.2 g | Same as in Example 2 |
| Example 5 | Crystal Violet Lactone 4.0 g | 4,4'-Diphenylmethanediisocyanate polymer mixture 0.6 g<br>Tolylenediisocyanate/trimethylolpropane adduct 0.6 g | Ethylenediamine/ethylene oxide/propylene oxide (1/2.5/73 by mole) adduct (molecular weight: 4,400) 0.3 g |
| Comparative Example 1 | Crystal Violet Lactone 4.0 g | — | — |
| Comparative Example 2 | Crystal Violet Lactone 4.0 g | — | Same as Example 1 |
| Comparative Example 3 | Crystal Violet Lactone 4.0 g | Same as in Example 1 | — |
| Comparative Example 4 | Same as in Example 2 | — | — |

TABLE 1-continued

| | Composition of Microcapsule Solution | | |
|---|---|---|---|
| Sample No. | Color Former | Polyisocyanate | Polyhydroxy Compound |
| Comparative Example 5 | Crystal Violet Lactone | Same as in Example 1 of British Patent 1,416,224 | |

Production of Microcapsule Sheet:

100 parts of a 15 wt% aqueous solution of PVA (a polyvinyl alcohol, degree of saponification 88%, degree of polymerization 500), 40 parts (on a solid basis) of carboxy-denatured SBR latex and 47 parts of starch granules (average diameter of granules 15 μm) were added to each of the microcapsule solutions obtained in the above-described examples and comparative examples.

Then, water was added to the resulting microcapsule slurry so as to adjust the solid component concentration to 20 wt%. Thus, microcapsule coating compositions were prepared.

Each coating composition was coated on a sheet of paper having a basis weight of 40 g/m² using an air knife coating machine so as to provide a dry coverage of 4.0 g/m², and dried to produce a microcapsule sheet.

Production of Developer Sheet:

2 parts of zinc oxide, 18 parts of calcium carbonate and 4 parts of zinc 3,5-di-α-methylbenzylsalicylate were admixed with 70 parts of water, and subjected to a dispersion treatment using an attriter for 30 minutes. To the resulting dispersion, 2.5 parts (on a solid basis) of carboxy-denatured SBR latex and 12 parts of a 10% PVA solution (saponification degree: 99%, polymerization degree: 1,000) were added, and stirred to prepare a homogeneous coating composition. This composition was coated on a sheet of paper having a basis weight of 50 g/m² using an air knife coating machine so as to provide a solids content of 4 g/m², and dried to produce a developer sheet.

Evaluation of Properties:

(1) Heat Resistance Test:

After being allowed to stand in an oven at 100° C. for 10 hours, each microcapsule sheet was brought into face-to-face contact with a developer sheet. A load of 600 kg/cm² was imposed on the superposed sheets to cause coloration. In a similar manner as above, coloration was caused in each fresh sample also, which had not receive the above-described heating treatment. Densities of the colored substances produced in these samples were measured with a Macbeth Model RD-918 densitometer and thereby, density ratios of heat teated samples to their respective fresh samples were determined. The heat resisting property was evaluated using such density ratios. For instance, if this ratio is from 98 to 100%, the microcapsules examined can be judged to be good in heat resistance.

(2) Solvent Resistance Test:

Each microcapsule sheet was dipped in ethyl acetate or isopropyl alcohol for about 1 second, and subjected to air drying. Thereafter, it was brought into a face-to-face counter with a developer sheet and thereon, a load of 600 kg/cm² was imposed to cause coloration. A solvent resisting property was evaluated by comparison with the corresponding fresh sample, in analogy with the heat resistance test.

(3) Color Formation Test:

Each microcapsule sheet was brought into a face-to-face contact with the developer sheet and thereonto, an alphabetical small letter m was continuously punched with an IBM Model 6747 electronic typewriter to cause coloration. After the lapse of one day from the coloration, the density of the typewritten letter m in the visible region, D(typewriter), was measured with a Macbeth Model RD-918 densitomer. If a measured density satisfies the relation, $0.35 \leq$ D(typewriter), there is no problem from the standpoint of practical use.

(4) Pressure Resistance Test:

Each microcapsule sheet was brought into a face-to-face contact with the developer sheet, and the superposed sheets were pressed by imposing a load of 10 kg/cm² thereon to generate pressure mark. After the lapse of 3 days as these samples were in the superposed condition, the color density of the mark developed on the developer sheet was measured. The value obtained by deducing the density of the support as a reference from the density of the mark was defined as D(fog). If D(fog) is not higher than 0.020, the microcapsules examined are judged to have good pressure resistance.

(5) Printing Test:

On the back side of each microcapsule sheet (the side opposite to the capsule-coated side), printing was carried out with various kinds of printing inks under various magnitudes of printing pressure using a Hiderberg-type relief printing machine (Model KSB). On the resulting microcapsule sheet, the developer sheet was positioned so as to face the surface of the microcapsule sheet to the developer sheet, and allowed to stand for 2 weeks as is. Then, changes of the developer sheet surfaces (fog) were evaluated by visual observation. As for the basis for evaluation, the following classification was employed.

A: generation of fog is not observed at all, so there is no problem from the standpoint of practical use.

B: the extent of fog generation is on the borderline between practical use possible and impossible.

C: color density is remarkably low and/or generation of fog is too great for practical use.

Results of the above-described tests are summarized in Table 2.

TABLE 2

| | Property Evaluation of Microcapsule Sheets | | | | |
|---|---|---|---|---|---|
| Example | Heat Resistance (%) | Solvent Resistance (%) | D(type-writer) | D (fog) | Printa-bility |
| Example 1 | 100 | 99.8 | 0.39 | 0.010 | A |
| Example 2 | 100 | 99.9 | 0.40 | 0.009 | A |
| Example 3 | 99.5 | 98.7 | 0.38 | 0.012 | A |
| Example 4 | 99.8 | 98.8 | 0.39 | 0.009 | A |
| Example 5 | 99.4 | 99.6 | 0.37 | 0.011 | A |
| Comparative Example 1 | 98.2 | 87.4 | 0.38 | 0.030 | C |
| Comparative Example 2 | 23.6 | 48.5 | 0.16 | 0.022 | C |
| Comparative Example 3 | 98.6 | 92.6 | 0.36 | 0.012 | C |
| Comparative Example 4 | 95.8 | 89.8 | 0.37 | 0.024 | C |
| Comparative Example 5 | 98.2 | 58.7 | 0.37 | 0.010 | B |

As can be seen from the results in Table 2, the microcapsule sheets obtained in accordance with the present invention have excellent properties as a pressure-sensitive recording paper. Further, the microcapsule sheets of the present invention showed marked improvements in evaluation of the overall properties (total judgement) compared with those obtained in the comparative examples. Consequently, the microcapsules produced in accordance with the present invention have proved to have film walls stable and highly resistive to undesired pressure, rubbing, heat and organic solvents, that is, to have very excellent properties.

While the invention has been described in detail and with reference to specific embodiments thereof, it will be apparent to one skilled in the art that various changes and modifications can be made therein without departing from the spirit and scope thereof.

What is claimed is:

1. A pressure sensitive recording paper containing microcapsules prepared by a process which comprises polymerizing melamine and formaldehyde, or polymerizing initial condensates of melamine and formaldehyde, around hydrophobic oil droplets containing a polyisocyanate or a prepolymer of polyisocyanate, wherein polyhydroxy compound is incorporated into said hydrophobic oil droplets prior to microencapsulation.

2. The pressure sensitive recording paper as claimed in claim 1, wherein said process comprises the steps of
   (1) preparing an aqueous solution containing a water-soluble high polymer;
   (2) emulsifying and dispersing a hydrophobic oily liquid, to which a polyisocyanate or a prepolymer thereof and a polyhydroxy compound are added in advance, in the aqueous solution prepared in step (1);
   (3) adding aqueous solution of melamine and formaldehyde or an initial condensation product (condensate) thereof to the emulsion prepared in step (2);
   (4) adjusting the pH of the system to the acidic side, and raising the temperature of the system with stirring, thereby forming an inner wall of polyurethane urea resin form the inside of the oily liquid dispersed and at the same time, forming an outer wall of melamine/formaldehyde resin through a polycondensation reaction of melamine and formaldehyde.

3. The pressure sensitive recording paper as claimed in claim 2, wherein the molar ratio of melamine to formaldehyde is from 2/1 to 3/1.

4. The pressure sensitive recording paper as claimed in claim 1, wherein the polyhydroxy compound is used in an amount of from 10 to 100 parts per 100 parts by weight of polyisocyanate or a prepolymer of polyisocyanate present in the hydrophobic oil droplets.

5. The pressure sensitive recording paper as claimed in claim 4, wherein the polyhydroxy compound is used in an amount of from 20 to 40 parts per 100 parts by weight of polyisocyanate or a prepolymer of polyisocyanate present in the hydrophobic oil droplets.

6. The pressure sensitive recording paper as claimed in claim 4, wherein the polyisocyanate or prepolymer of polyisocyanate is used in an amount ranging from 0.01 to 2 parts per 100 parts by weight of a hydrophobic oily liquid used for forming the hydrophobic oil droplets.

7. The pressure sensitive recording paper as claimed in claim 6, wherein the polyisocyanate or prepolymer of polyisocyanate is used in an amount ranging from 1 to 1.5 parts per 100 parts by weight of a hydrophobic oily liquid used for forming the hydrophobic oil droplets.

8. The pressure sensitive recording paper as claimed in claim 1, wherein an ammonium salt is used to promote the reaction between the melamine and formaldehyde.

9. The pressure sensitive recording paper as claimed in claim 8, wherein said ammonium salt is selected from the group consisting of ammonium chloride, ammonium sulfate, ammonium nitrate, and ammonium dihydrogenphosphate.

10. The pressure sensitive recording paper as claimed in claim 1, wherein the molar ratio of melamine to formaldehyde is from 2/1 to 3/1.

* * * * *